United States Patent

[11] 3,624,597

[72] Inventor Arne J. Johansen
 Horten, Norway
[21] Appl. No. 851,271
[22] Filed Aug. 19, 1969
[45] Patented Nov. 30, 1971
[73] Assignee Forsvarets Forskningsinstitutt
 Horten, Norway

[54] ECHO-RECORDING APPARATUS
 12 Claims, 3 Drawing Figs.
[52] U.S. Cl.................................................. 340/3R,
 346/109
[51] Int. Cl.................................................. G01s 9/66
[50] Field of Search.......................................... 346/108,
 109; 340/3, 3 R, 3 C

[56] References Cited
 UNITED STATES PATENTS
 2,884,589 4/1959 Campbell ..................... 346/109 X
 3,438,050 4/1969 Aschenbrenner et al..... 346/108 X

*Primary Examiner*—Richard A. Farley
*Attorney*—Watson, Cole, Grindle & Watson

ABSTRACT: Echo-recording apparatus comprising a first mirror galvanometer adapted and disposed to effect a time-base scan of a light beam across a paper strip, which is moving in its longitudinal direction, the light beam being intensity modulated by a light modulator including a second mirror galvanometer or a Kerr cell, and said recording apparatus also including digital control means for control of the time-base scan in conjunction with the triggering of an auxiliary pulse transmitter connected to the apparatus.

ECHO-RECORDING APPARATUS

The invention relates to an echo-recording apparatus for recording of echo signals in order to permit analysis and/or data processing of the same at a later instant of time.

In echo-recording apparatus for sonar or echo sounding applications, mechanical recorders are usually utilized. In such cases a pen or a stylus is, for each transmitted pulse, moved on a paper strip which is moved with constant speed in its longitudinal direction. Upon reception of the corresponding echo signals, said pen or stylus is actuated so as to record, point by point, a curve representing the position of the target in relation to the sonar or echo sounding system as a function of time. This method is in principle satisfactory, but due to the great inertia inherent in a mechanical system, it is difficult to achieve a high, and at the same time sufficiently constant, speed of the time-base scan across the paper.

Electronic recorders, which usually comprise cathode-ray tubes, are primarily known from radar technology. These are fast enough for most echo localization and analysis purposes, but they will not give permanent recordings.

From this background it will be evident that an echo-recording apparatus with an essentially higher scanning velocity than that of known mechanical recorders and simultaneously able to produce a permanent registration, would represent considerable technical progress. Such apparatus may be adapted for use, not only in the sonar and echo sounding technology, but also in fault localization in cable systems, physical investigations of material characteristics and in long-distance radar systems.

It is a main object of the present invention to provide an echo-recording apparatus with the above advantages over prior art devices.

According to the invention this is achieved in an echo-recording apparatus comprising a light-sensitive paper strip moving with constant speed; a beam of concentrated light; a first mirror galvanometer the moving coil of which is connected to a time-base generator, and the mirror of which has an axis of rotation parallel to the motion direction of the paper strip and disposed to reflect said beam towards said paper strip; a light modulator comprising a second mirror galvanometer, the moving coil of which is connectable to an echo signal receiver, and the mirror of which also has an axis of rotation parallel to the motion direction of the paper strip and is disposed to reflect said light beam towards the first galvanometer; lens means being positioned between said galvanometers and adapted to focus the light beam reflected from the mirror of the second galvanometer on the mirror of the first galvanometer independently of moderate angular displacement of said second galvanometer mirror from its repose position; and an opaque screen disposed to block the light transmission path between the galvanometers when said moving coil of the second galvanometer is currentless, but not in case the current through said coil exceeds a predetermined magnitude.

Alternatively, however, the modulator may be a Kerr cell, situated in the path of the light beam, the electrical input to said cell being connectable to an echo signal receiver.

An optomechanical recorder of the types indicated will have moving parts with considerably less inertia than that of the moving parts utilized in ordinary mechanical recorders. Further, the scanning light beam will make permanent marks on the paper when echo signals are received. Thus, new possibilities in echo registration techniques are afforded to achieve better control, flexibility and resolution in the recording process.

Thus, in mechanical recorders it is very difficult to trigger the moving system by means of a control pulse from the transmitter, due to the great inertia of the system. However, in an echo-recording apparatus comprising an optomechanical recorder according to the invention, the time-base scan may readily be triggered from the transmitter, or the transmitter pulses may equally well, in conventional manner, be triggered by the recorder.

In addition, a third possibility is also obtained, as both the time-base scan and the pulse emission from the transmitter may be controlled from common central control means. By such means, the inherent properties of the optomechanical recorders may be most efficiently utilized.

Thus, according to the invention, the time-base generator is also provided with start and stop inputs and adapted to start the generation of a time-base pulse in response to a start signal applied to a start input and to stop the pulse generation in response to a stop signal applied to a stop input.

Further, according to the invention, the present echo-recording apparatus comprises control means provided with a first output connectable to a pulse transmitter for emission of trigger signals to the transmitter, a second output connected to the start input for emission of start signals to the time-base generator, and a third output which is connected to the stop input for emission of stop signals to the time-base generator. The control means are adjustably adapted to control the sequence of the three signals and the interval between them according to a predetermined program. The construction and further properties of the control means as well as of the other components of the echo-recording apparatus, will appear from the following description with reference to the accompanying drawings, which illustrate an apparatus according to the invention, particularly, adapted to echo sounding applications.

Figure 1:
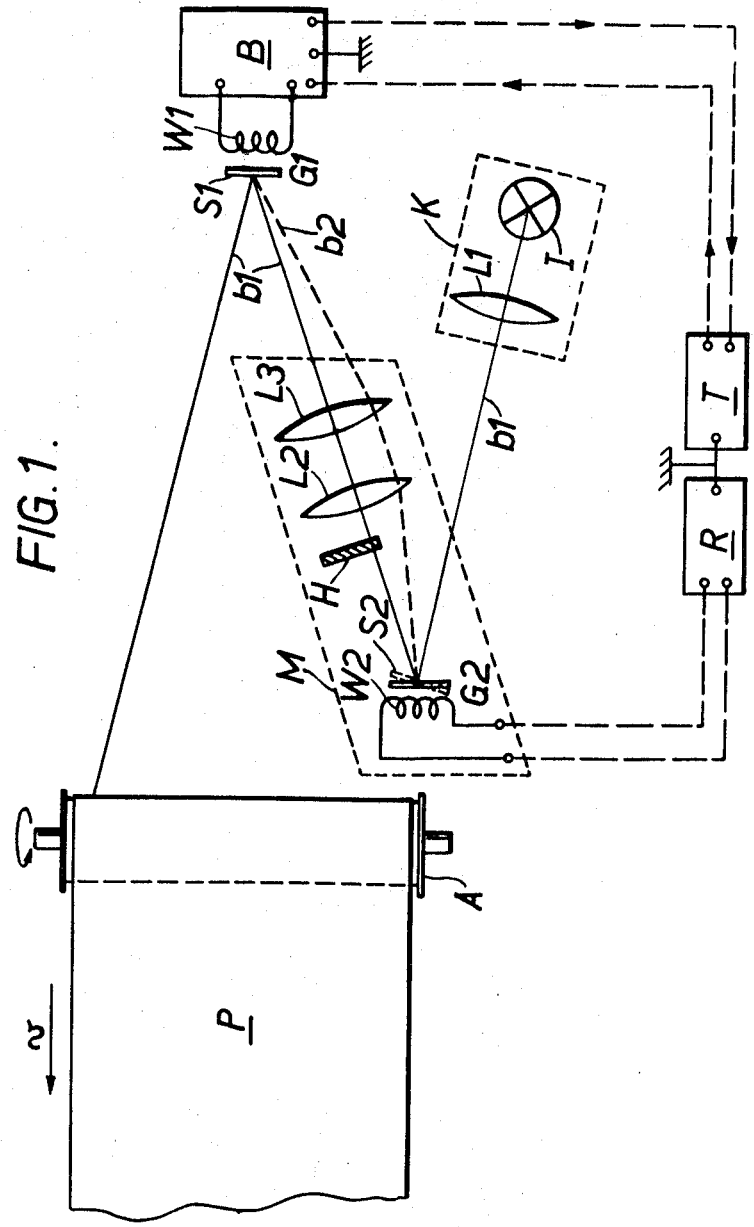
FIG. 1 illustrates, in principle, the design of an optomechanical recorder, according to the invention.

In FIG. 1, P is a paper strip which is sensitive to ultraviolet light, and which is pulled off a roller A with constant speed in the direction of the arrow. A light source K, comprising a lamp I and a convergent lens L1, directs a light beam towards a galvanometer mirror S2 in a light modulator M. This modulator M includes, in addition to the mirror galvanometer G2 with a moving coil W2 and a mirror S2, an opaque screen H and lens means L2, L3. Assuming for a moment the screen H removed, the light beam will, in the repose state of the galvanometer G2, follow a path $b1$ from the mirror S2, through the lenses L2, L3 to the mirror S1, of another galvanometer G1. This mirror S1, will reflect the light beam towards the paper strip P. The mirror S1 is rotatable in such a way that the light beam will be swept across the paper strip with approximately constant velocity, when a sawtooth-current waveform is supplied to the associated moving coil W1 from a time-base generator B. When, however, the screen H is permanently inserted in its appropriate position, the light transmission through the modulator M will be blocked when the moving coil W2 is currentless, and consequently the mirror W2 is in its repose state.

Figure 3:
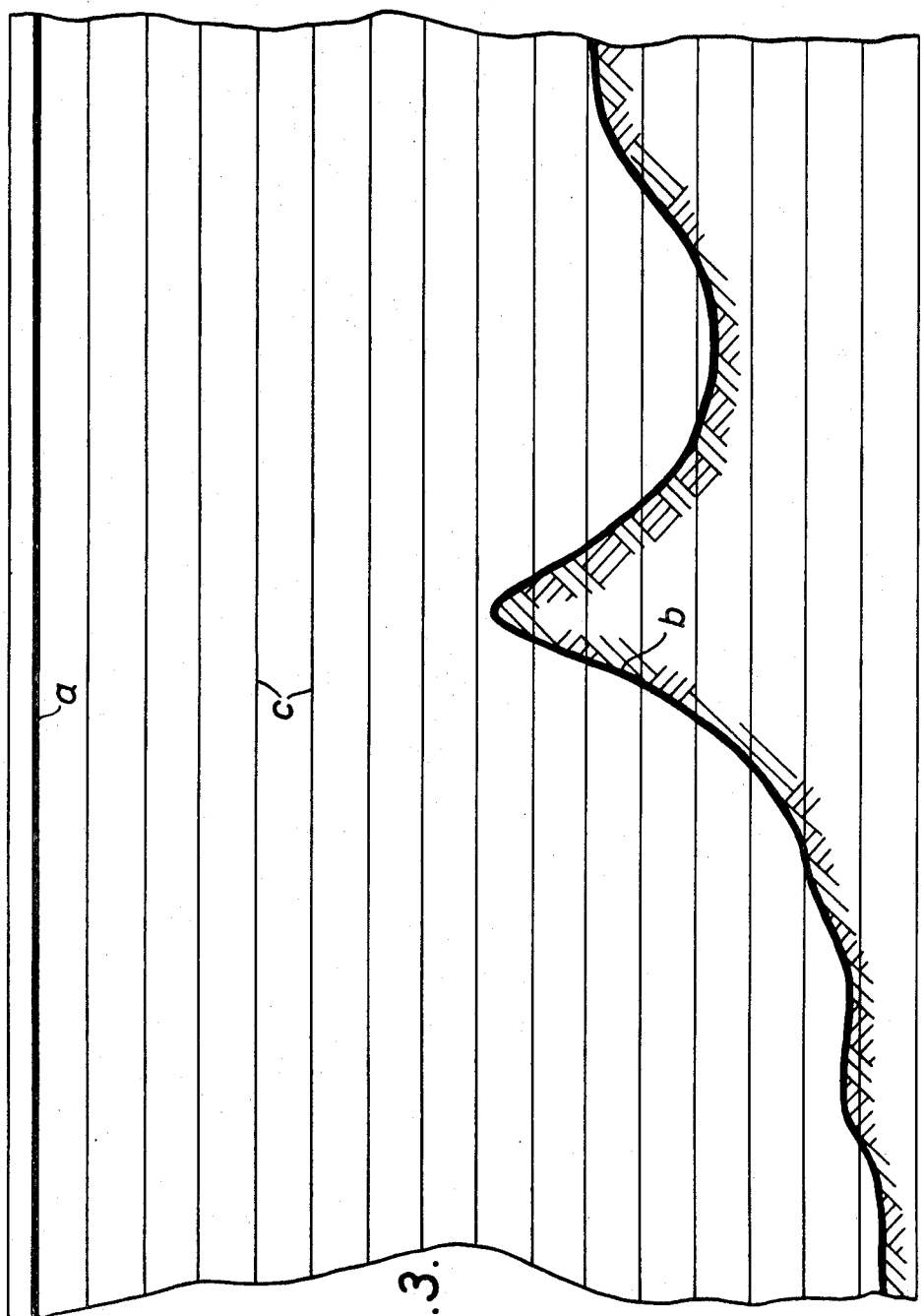
FIG. 3 is an echogram of a region of the sea bottom, obtained by means of the apparatus of FIG. 2.

But, if a current pulse of sufficient amplitude is supplied to the galvanometer coil W2 from an auxiliary echo signal receiver R, the mirror S2 will be rotated to an corresponding angular position, as shown in dash lines in FIG. 1. The reflected beam will then be able to outflank the screen H, while still being focused on the mirror S1 of the time-base galvanometer G1 by means of the lens means L1, L2. Thus, in this case the light beam will follow the paths $b2$, shown in dash lines in FIG. 1. Consequently, the light beam will only be able to hit and mark the paper P when the modulator M is receiving an echo pulse of sufficient strength, to deviate the beam as to outflank the screen H. As the paper strip is moved with constant speed, the echo marks from successive scans will combine to form an apparently continuous curve on the paper strip P, e.i. as shown in FIG. 3.

To avoid the influence from ambient light sources, the paper P is, in a preferred embodiment of the invention, only sensitive to ultraviolet light, the source K emitting light with strong ultraviolet components.

The time-base generator B may be triggered from a pulse transmitter T, or preferably, so adapted and disposed as to trigger a transmitter T, as indicated by two dash connection lines with opposite arrow directions in FIG. 1.

The pulse transmitter T and the echo signal receiver R are not included in the apparatus according to the invention, and for this reason the associated connections are shown in dash lines in FIG. 1.

Preferably, however, the various functions of the time-base generator B, the optomechanical recorder and the auxiliary pulse transmitter are controlled by central control means, included in the apparatus according to the invention.

Figure 2:
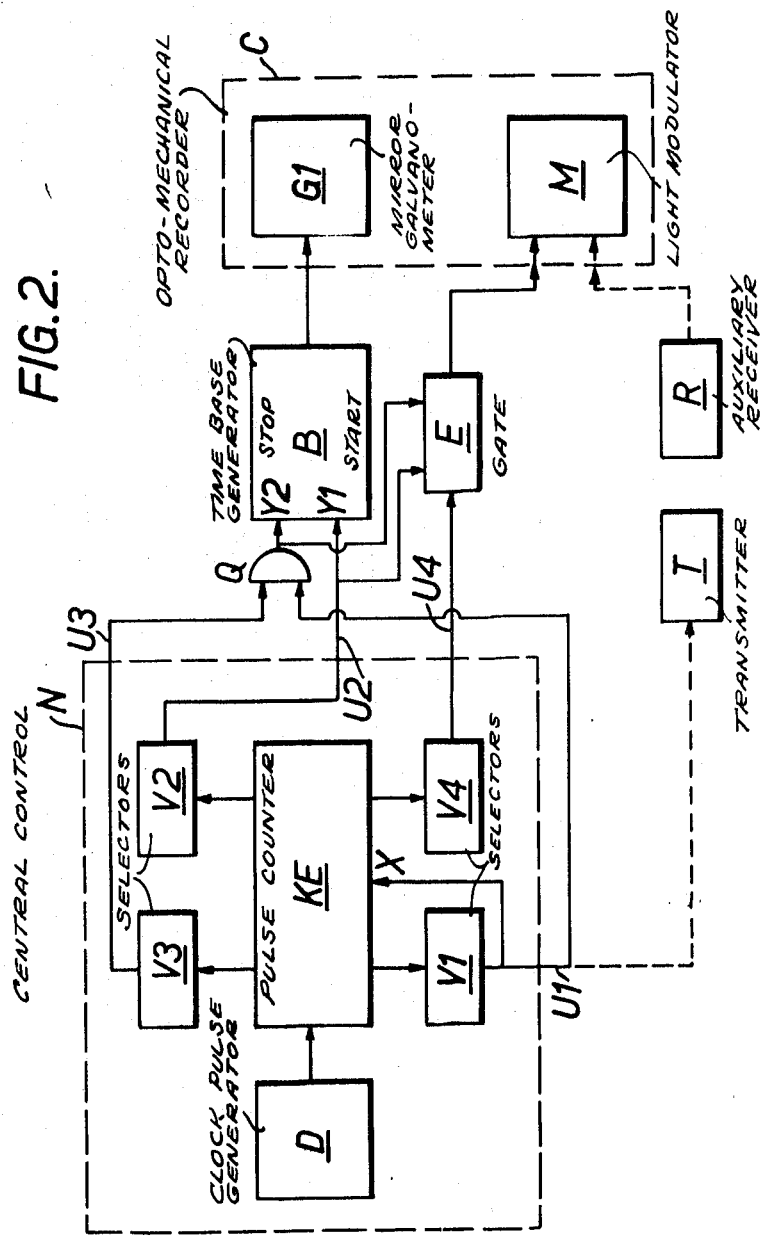
FIG. 2 is a block diagram of an embodiment of an apparatus according to the invention, the interior arrangements of the individual blocks forming no part of the invention, as the properties of the blocks may be realized by conventional means.

Referring now to FIG. 2, such central control means is generally indicated at N, and adapted to control the pulse emission from the transmitter T, the start and stop of the time-base scan executed by the time-base generator B, and in addition, a writing of equidistant marking lines on the moving paper strip P, mentioned above. C designates the optomechanical recorder, shown in FIG. 1, which is receiving echo signals from an auxiliary receiver R.

The control means N is constituted by a clock-pulse generator D and a pulse counter KE, which is connected to the output of the generator D. The clock pulse rate may conveniently be set in conformity with the sound velocity in sea water, e.g. in such a way that the time interval between the pulses corresponds to the go-and-return transit time of a sound pulse through one meter of sea water.

The counter advances one step for each received clock pulse, and if the terminal of a counter step is connected to one of the four outputs U1–4 of the control means, the corresponding clock pulse will be emitted over the associated output.

Thus, in the present case, an echo sounding transmitter T is connected to the first output U1; and a selector V1, which is included in the control means N, may be adjusted to connect any individual predetermined counter step terminal with this first output U1. In the same way, the second and third outputs are connected to start and stop inputs, Y1 and Y2, (Y2 via an OR gate), respectively, of the time-base generator B. Further, corresponding selectors V2 and V3 in the control means N are set to transfer clock pulses from selected counter steps over such outputs U2, U3 to the time-base generator B for the start and stop, respectively, of the sawtooth scan pulses, which are supplied to the mirror galvanometer G1 of the recorder C.

The fourth selector V4 connects jointly a number of counter steps in an arithmetic sequence, to the fourth output U4, which, through an electronic gate E, is connected to the light modulator M of the recorder C. If the selector V4 for instance is connected to every 10th counter step, consequently every 10th clock pulse will actuate the modulator M, and if, as previously indicated, each clock pulse corresponds to a distance of 1 meter in the sea, a grid of equidistant marking lines C will be written on the paper strip, the distance between adjacent lines corresponding to 10 meters in the sea, as shown in FIG. 3. The electronic gate E may be controlled by the start and stop pulses to the time-base generator B in such a way, that the gate E only will be open during the active scan periods of the light beam of the recorder C, as the actuation of the light modulator would be without purpose outside these periods.

Further, the counter KE has a reset input X, which normally is connected to the first output U1, of the control means N, so that the counter will be reset and start a new counting sequence when a transmitter pulse is emitted. Therefore, the selector V1 should be set at the counter step corresponding to the upper limit of the desired sounding range, and this selector will be functioning as a range selector. The reset input X may, however, alternatively be connected to an external source (not shown).

Further functional properties of the present apparatus will be better understood from the following operational example, wherein it will be assumed that each clock pulse corresponds to a distance of 1 meter in the sea.

For the investigation of the depth range from 0 to 400 meters, the range selector V1 is set at counter step No. 400, whereas the start selector V2 is set at the 0 step and the stop selector V3 also at step No. 400, in order to make the time-base scan include the whole range, 0–400 meters.

The rising time of sawtooth pulse should of course be set accordingly, in order to efficiently utilize the width of the paper strip P.

For this investigation it is suitable to the purpose to furnish the paper strip with marking lines for every 20th meter in the sea, and consequently every 20th counterstep will be connected to the output U4 by setting the selector V4 accordingly.

Now, let it be assumed that a target is registered at a depth of about 300 meters. In order to investigate this target with a better resolution, the start selector V2 may for instance be set at the counterstep 290, while the stop selector V3 is set at counterstep No. 310, and the slope of the sawtooth pulse accordingly, to assume a light beam scan across the paper P, corresponding to the difference between the above settings.

By this means the details of the target may be studied in a far larger scale. Similarily V4 may be adjusted to give a marking line for every meter.

If, for instance, a particularly interesting echo mark appears between 305 and 306 meters, the selectors V2 and V3 may be set at countersteps Nos. 305 and 306, respectively; and with a correspondingly high rising rate of the front slope of the sawtooth pulse, this mark may be expanded over the greater part of the paper strip width.

Because of the extremely small inertia of the moving system of the apparatus according to the invention, a recorder of the present type may be useful even with the high scanning velocity involved in the above investigation.

To facilitate the adjustment of the time-base scan the apparatus may, in any conventional way, be adapted for automatically matching the rising rate of the sawtooth pulse to the set scanning range, in order to obtain optimum utilization of the width of the recording paper.

In the embodiment of the present apparatus which is shown in FIG. 2, not only the third output U3 of the control means, but also the first output U1 of the same, is connected to the stop input Y2 of the time-base generator B, and for the purpose of isolation also an OR gate is inserted between the above outputs U1, U3 and the input Y2. This is done to secure the transfer of a stop pulse to time-base generator B, even if the selector V3 unintentionally has been connected to a later counter step than V1, which in this case transfers the reset pulse to the pulse counter KE.

FIG. 3 illustrates a part of an echogram obtained by echo soundings of depths of approximately 100 meters. Here, the range selector has been set at 160 meters and the marking selector has been set for a marking-line spacing corresponding to 10 meters. Start and stop selectors V2, V3 are set for a start of the time-base scan when the transmitter pulse is emitted and a stop of the same just before the resetting of the pulse counter KE. The emitted pulses and the echo pulses from the sea bottom are registered as broad, strong lines $a$ and $b$, respectively, whereas the marking lines $c$ are considerably thinner, as the marking pulses intentionally are made much shorter than the echo sounding pulses.

I claim:

1. Echo-recording apparatus for operation with an echo signalling receiver, comprising; a light-sensitive paper strip moving with constant speed, a source of concentrated light beam, a time-base generator, a first mirror galvanometer having a moving coil which is connected to said time-base generator and a mirror which has an axis of rotation parallel to the motion direction of the paper strip and disposed to reflect said beam towards said paper strip; a light modulator including a second mirror galvanometer having a moving coil which is connectable to said echo signal receiver and which also has an axis of rotation parallel to the motion direction of the paper strip and disposed to reflect said light beam towards the first galvanometer, lens means being positioned between said galvanometers and adapted to focus the light beam reflected from the mirror of the second galvanometer on the mirror of the first galvanometer independently of moderate angular displacement of said second galvanometer mirror from its repose position, and an opaque screen disposed to block the light transmission path between the galvanometers when said moving coil of the second galvanometer is currentless and not to block the light transmission path between the galvanometer when the current through said coil exceeds a predetermined magnitude.

2. Echo-recording apparatus as claimed in claim 2, wherein the light source emits a light beam of ultraviolet spectral components, the light-sensitive paper being considerably more sensitive to ultraviolet light than other light.

3. Echo-recording apparatus for operation with a pulse transmitter as claimed in claim 1 wherein said time-base generator includes an output connected to said pulse transmitter to trigger the emission of transmitter pulses in adjustable phase in relation to the time-base pulses.

4. Echo-recording apparatus as claimed in claim 1, wherein said time-base generator further includes start and stop inputs to start the generation of a time-base pulse in response to a start signal applied to said start input and to stop said pulse generation in response to a stop signal applied to said stop input.

5. Echo-recording apparatus for operation with a pulse transmitter as claimed in claim 4 further comprising control means having a first output connected to said pulse transmitter for emission of trigger signals to said transmitter and a second output connected to said start input for emission of start signals to said time-base generator and a third output connected to said stop input for emission of stop signals to said time-base generator, said control means are adjustable to control the sequence of said three signals and the interval between them according to a predetermined program.

6. Echo-recording apparatus as claimed in claim 5, wherein said control means includes a clock-pulse generator, a pulse counter connected to the output of said clock-pulse generator, and three selector means each adapted to connect any selected counter step of said pulse counter with one of said three outputs of the control means for transfer of clock pulses corresponding to said selected counter steps to said pulse transmitter and said time-base generator.

7. Echo-recording apparatus as claimed in claim 6, wherein said clock-pulse counter further includes an input for the reset of the counter to an initial position in response to a suitable reset signal applied to said input, said input is connected to at least one of the outputs of the control means so that the reset of said counter will take place upon the counter reaching the first counter step which is connected to one of these last-mentioned outputs.

8. Echo-recording apparatus as claimed in claim 7, wherein said second output from the control means is connected to an earlier counter step than said third output which is connected to an earlier step than said first output, the reset input of said counter is connected to the first output so that said counter will be reset simultaneously with the triggering of a transmitter pulse, and said time-base generator is activated during a preadjusted time interval during the subsequent counting sequence.

9. Echo-recording apparatus as claimed in claim 8, wherein the control means comprise a fourth output and fourth selector means for simultaneous connection of a number of counting steps in arithmetical sequence to said fourth output, said fourth output is connected to an input of the light modulator so that the clock pulses corresponding to said connected counting steps actuate the light modulator to effect a series of equidistant marks along each time-base scan across the paper strip.

10. Echo-recording apparatus as claimed in claim 9, further comprising pulse-producing means inserted between the fourth output of the control means and the light modulator and having at least one control input connected to at least one output of the control means, whereby said pulse-producing means is triggered for pulse production at said clock-pulse rate only during the active period of the time-base generator.

11. Echo-recording apparatus for operation with an echo-signalling receiver, comprising; a light-sensitive paper strip moving with constant speed, a source for producing a concentrated light beam, a time-base generator including start and stop inputs to start the generation of a time-base pulse in response to a start signal applied to said start input and to stop said pulse generation in response to a stop signal applied to said stop input, a first mirror galvanometer having a moving coil connected to said time-base generator and a mirror having an axis of rotation parallel to the direction of movement of said paper strip and disposed to reflect said light beam towards said paper strip, a light modulator positioned in the path of said light beam consisting of a Kerr cell having associated polarization means, and the electrical input of said cell is connected to said echo signal receiver for signalling said cell.

12. Echo-recording apparatus for operation with a pulse transmitter as claimed in claim 11, further comprising control means having a first output connected to said pulse transmitter for emission of trigger signals to said transmitter, a second output connected to said start input for emission of start signals to said time-base generator, and a third output connected to said stop input for emission of stop signals to said time-base generator, the control means being adjustable to control the sequence of said three signals and the interval between them according to a predetermined program.

* * * * *